US008465786B2

(12) United States Patent
DuBois et al.

(10) Patent No.: US 8,465,786 B2
(45) Date of Patent: Jun. 18, 2013

(54) NON CALORIC FROZEN CARBONATED BEVERAGE

(75) Inventors: Grant E. DuBois, Roswell, GA (US); James M. Shepherd, Atlanta, GA (US); Sandra C. Ryan, Kennesaw, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/838,809

(22) Filed: Apr. 20, 2001

(65) Prior Publication Data
US 2003/0224095 A2 Dec. 4, 2003

(51) Int. Cl.
A23L 2/00 (2006.01)

(52) U.S. Cl.
USPC .......................................... 426/590; 426/548

(58) Field of Classification Search
USPC .................................. 426/590, 599, 569, 548
See application file for complete search history.

(56) References Cited

U.S. PATENT DOCUMENTS

| | | | |
|---|---|---|---|
| 3,460,713 A | 8/1969 | Cornelius | |
| 3,619,205 A * | 11/1971 | LeVan et al. | 426/590 |
| 3,647,472 A * | 3/1972 | Speech et al. | 426/115 |
| 3,826,829 A * | 7/1974 | Marulich | 426/590 |
| 4,262,032 A | 4/1981 | Levin | |
| 4,626,441 A * | 12/1986 | Wolkstein | 426/548 |
| 4,760,138 A * | 7/1988 | So et al. | 536/102 |
| 4,770,889 A * | 9/1988 | Sakai et al. | 426/548 |
| 4,790,999 A * | 12/1988 | Ashmont et al. | 426/592 |
| 4,808,428 A * | 2/1989 | Forsstrom et al. | 426/569 |
| 4,810,516 A | 3/1989 | Kong-Chan | |
| 4,902,525 A | 2/1990 | Kondou | |
| 4,963,382 A | 10/1990 | Arena et al. | |
| 4,971,797 A * | 11/1990 | Cherukuri et al. | 424/440 |
| 4,986,994 A * | 1/1991 | Baccus, Jr. | 426/330.3 |
| 5,017,400 A | 5/1991 | Olinger et al. | |
| RE33,719 E | 10/1991 | Levin | |
| 5,064,672 A | 11/1991 | Mazur | |
| 5,069,924 A * | 12/1991 | Baccus, Jr. | 426/590 |
| 5,103,649 A | 4/1992 | Kieffer | |
| 5,226,450 A | 7/1993 | Lambourn | |
| 5,273,771 A | 12/1993 | Rapaille et al. | |
| 5,275,835 A | 1/1994 | Masterson et al. | |
| 5,380,541 A * | 1/1995 | Beyts et al. | 426/548 |
| 5,399,365 A | 3/1995 | Yatka et al. | |
| 5,478,587 A | 12/1995 | Mingione | |
| 5,516,763 A | 5/1996 | Heikkila et al. | |
| 5,518,754 A | 5/1996 | Miller et al. | |
| 5,527,554 A | 6/1996 | Olinger et al. | |
| 5,532,022 A | 7/1996 | Miller et al. | |
| 5,585,480 A | 12/1996 | Vogel et al. | |
| 5,672,589 A | 9/1997 | Heikkila et al. | |
| 5,700,514 A | 12/1997 | Gonze et al. | |
| 5,706,661 A | 1/1998 | Frank | |
| 5,736,185 A | 4/1998 | Kohno et al. | |
| 5,743,097 A | 4/1998 | Frank | |
| 5,806,550 A | 9/1998 | Frank | |
| 5,853,785 A | 12/1998 | Nayyar et al. | |
| 5,912,030 A | 6/1999 | Huzinec et al. | |
| 5,973,212 A * | 10/1999 | De Sadeleer et al. | 568/852 |
| 6,010,734 A * | 1/2000 | Whelan et al. | 426/565 |
| 6,045,850 A | 4/2000 | Kondou | |
| 6,048,567 A * | 4/2000 | Villagran et al. | 426/594 |
| 6,066,345 A | 5/2000 | de Cock | |
| 6,071,500 A | 6/2000 | Thistle | |
| 6,083,527 A | 7/2000 | Thistle | |
| 6,129,943 A * | 10/2000 | Zeller et al. | 426/564 |
| 6,177,064 B1 * | 1/2001 | de Troostembergh et al. | 424/49 |
| 6,189,745 B1 | 2/2001 | Frank | |
| 6,432,464 B1 | 8/2002 | Andersen et al. | |
| 6,456,460 B1 * | 9/2002 | Connolly et al. | 360/126 |
| 6,468,576 B1 * | 10/2002 | Sher et al. | 426/565 |
| 6,475,540 B1 | 11/2002 | Howling et al. | |
| 6,749,879 B2 * | 6/2004 | Broz | 426/565 |
| 2002/0001656 A1 | 1/2002 | Mason et al. | |
| 2002/0136803 A1 * | 9/2002 | Stefandl | |
| 2002/0160090 A1 | 10/2002 | Lee et al. | |
| 2002/0187232 A1 | 12/2002 | Lee et al. | |
| 2002/0197371 A1 | 12/2002 | Lee et al. | |
| 2002/0197376 A1 * | 12/2002 | Broz | |

FOREIGN PATENT DOCUMENTS

| | | |
|---|---|---|
| EP | 0 257 626 | 3/1988 |
| EP | 0 511 761 A1 | 4/1992 |
| EP | 0 236 288 B1 | 12/1993 |
| EP | 0 759 273 | 2/1997 |
| EP | 0 792 589 | 9/1997 |
| EP | 0792589 * | 9/1997 |
| EP | 0 941 668 A1 | 9/1999 |
| EP | 1 210 880 A1 | 6/2002 |
| GB | 2 093 677 | 9/1982 |
| JP | 7-274829 | 10/1995 |
| JP | 9-224588 | 9/1997 |
| JP | 10-136953 | 5/1998 |
| JP | 11-346708 | 12/1999 |
| JP | 2000-032919 | 2/2000 |
| JP | 2000-037178 | 2/2000 |
| WO | WO 97/22263 | 6/1997 |
| WO | WO98/16120 | 4/1998 |
| WO | WO 99/30577 | 6/1999 |
| WO | WO99/30578 | 6/1999 |
| WO | WO 99/34689 | 7/1999 |
| WO | WO 00/42865 | 7/2000 |
| WO | WO 01/28357 | 4/2001 |
| WO | WO 02/085130 | 10/2002 |
| WO | WO 02/087358 | 11/2002 |
| WO | WO 02/087359 | 11/2002 |

OTHER PUBLICATIONS

Francis, F. J. 2000. Encyclopedia of Food Science and Technology, $2^{nd}$ edition, vol. 4. John Wiley & Sons, Inc., New York. p. 2212.*
Food and Drug Administration, HHS 101.6. 2000. Code of Federal Regulations. 21 CFR Ch. 1 (Apr. 1, 2000 Edition) 101.6, p. 95.*
G.R. Shore et al., Taste and Mouthfeel in Low Calorie Soft Drinks, Pickenhagen/Contribution of Low-and Non-Volatile Materials to Flavor, pp. 119-123.

* cited by examiner

*Primary Examiner* — Carolyn Paden
(74) *Attorney, Agent, or Firm* — Nicole Morris

(57) ABSTRACT

The present invention is a non-caloric or reduced calorie frozen carbonated beverage and a method of making it. The freezing point of a diet beverage syrup is reduced through the use of a freezing point depressant, particularly a Sugar MNS which is used to replace a portion of the known high-potency non-caloric sweetener. The preferred Sugar MNS for use in the beverage and method of the present invention is erythritol.

22 Claims, No Drawings

NON CALORIC FROZEN CARBONATED BEVERAGE

FIELD OF THE INVENTION

The present invention relates to a method of making reduced calorie and non-caloric frozen carbonated and non-carbonated beverages through the use of freezing point depressants, particularly Sugar MacroNutrient Substitutes (MNSs) for example, erythritol, for depressing the freezing point of the beverage. More particularly, the present invention relates to non-caloric frozen carbonated beverages made by the disclosed method.

BACKGROUND OF THE INVENTION

Full calorie frozen carbonated beverages (FCBs) are known in the art and have been produced for years. FCBs are produced via devices that freeze a mixture of ingredients including syrup, water and carbon dioxide in a mixing chamber. The mixture freezes on the inner surface of the mixing chamber, which is surrounded by a helical coil through which a refrigerant passes. A rotating shaft is disposed inside the chamber which has a plurality of outwardly projecting blades that scrape the mixture off the inside wall of the mixing chamber. Once the carbonated beverage is in the desired frozen state, the product is dispensed from the chamber through a product valve.

The temperature and viscosity of the ingredients within the mixing chamber are maintained by a control system that controls the refrigeration system. Product quality is controlled through the balance of ingredients as well as pressures and temperatures within the chamber. The chemical properties of FCBs also play an important part in the normal functioning of FCB dispensing devices and the quality of the FCB products.

Current FCB products are limited to full calorie FCBs. Caloric products contain common sugars, such as sucrose or high fructose corn syrup (HFCS), which are used as sweeteners at concentrations of ca. 10% (w/v). These sugars play an important part in the freezing point depression of FCBs. Under normal operating conditions of FCB machines, the addition of caloric sweeteners depresses the freezing point of the product making them dispensable in a slush-like state. By contrast, a diet beverage, or non-caloric syrup contains no common sugars such as sucrose or HFCS, and thus lacks a freezing point depressant. Without a modified freezing point, diet syrup would freeze into blocks of ice in FCB machines rather than attaining the slush-like property found in caloric FCBs and necessary for proper dispensing.

Freezing point is a colligative property and the freezing point of a solution depends on the number of solute molecules present, not on the nature of the solute. Non-caloric ingredients, such as salts or acids, could be added to diet syrup to provide freezing point depression, thus allowing slush to be obtained. However, these ingredients result in a salty or sour product affecting the taste and quality of the beverage. A proposed alternative to the addition of acids or salts would be to increase the amount of non-caloric sweeteners e.g., aspartame, saccharin, or a mixture of these to cause freezing point depression. However, due to the potency of these sweeteners, the taste and quality of the resulting diet FCBs will again be unacceptably altered.

The present invention overcomes the problems associated with the production of diet FCBs through the use of freezing point modifiers. Freezing point modifiers include 1) one or more Sugar MNSs alone or in combination with salts and/or acids, and 2) one or more sugars or sugar alcohols in combination with one or more salts, acids and/or Sugar MNSs. In both cases, the freezing point modifier will usually be used in combination with a high-potency non-caloric sweetener or mixture of such sweeteners. Reduced calorie and diet FCBs according to the present invention can achieve the necessary slushy state without unacceptable alterations of the taste and quality of the diet syrup.

Sugar MNSs have been used as low calorie sweeteners in a variety of food products. A sugar MNS is a non-caloric or reduced calorie polyhydric alcohol with molecular weight ranging from ca. 100-1000.

U.S. Pat. No. 4,810,516, by Knog-Chan et al. discloses the use of polyols in the production of reduced calorie chocolate confections. Knog-Chan et al. substitute a nondigestible polyol fatty acid polyester for the natural fat. Knog-Chan et al. also disclose the use of an artificial sweetener plus a partially or wholly nondigestible carbohydrate bulking agent as substitutable for sugar.

European Patent Application NO. 236,288 to Bernhardt discloses edible, wholly or partially nondigestible intermediate melting polyol fatty acid polyesters having certain rheological properties (e.g., viscosity, liquid/solid stability) at body temperatures. These intermediate melting polyol polyesters are disclosed as partial or total fat replacements in food products, including ice cream and other fat-containing frozen desserts.

U.S. Pat. No. 6,010,734, to Whelan et al., discloses a low calorie frozen dessert product, which comprises from about 2 to about 20% fat of which about 30 to 100% is edible, wholly or partially nondigestible polyol fatty acid polyesters.

Based on the above, it is clear that polyol polyesters have only been used in the area of frozen food products as fat substitutes. These polyols reduce the caloric content of the food product by fat substitution.

Known sugar MNSs for use as low calorie sweeteners include erythritol, maltitol, lactitol, isomalt, fructooligosaccharide sweeteners and xylitol. Again, these Sugar MNSs are used to reduce the caloric content of food, but in this instance, they replace sugar and other sweeteners. The following examples describe the known manner in which Sugar MNSs have generally been used.

Erythritol is a known sweetener for use in the production of reduced calorie food products.

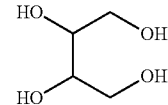

ERYTHRITOL

U.S. Pat. No. 5,273,771, to Rapaille et al. discloses a composition suitable for use as the sweetener in a reduced calorie food product. The sweetener includes 5 to 50% by weight erythritol, 30 to 80% by weight sorbitol and 5 to 25% by weight glucose oligomer of DE 10 to 30.

U.S. Pat. No. 5,973,212, to De Sadeleer et al. discloses a method for producing spraying dried erythritol. This free-flowing erythritol powder is disclosed for use as a sweetener preferably in combination with a synthetic sweetener such as aspartame.

U.S. Pat. No. 6,045,850, to Kondou discloses a low-calorie compounded cocoa composition including cocoa powder, erythritol, and a sweetener.

Maltitol and xylitol are other Sugar MNSs that are commonly used in reduced calorie food products to replace full calorie sweeteners.

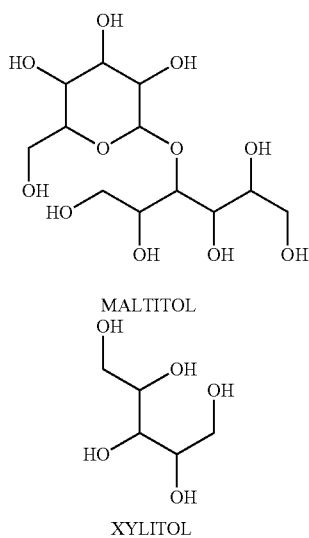

MALTITOL

XYLITOL

U.S. Pat. Nos. 6,083,527 and 6,071,500 to Thistle disclose a candy-like confection which minimizes tooth decay. The confection preferably includes xylitol as the natural sweetener and calcium hydroxide which increases the pH level of the saliva in the mouth to reduce the presence of bacteria.

U.S. Pat. No. 5,017,400 to Olinger et al. discloses compositions containing a combination of xylitol and maltitol, which is claimed to provide a synergistic sweetening effect.

U.S. Pat. No. 5,700,514, to Gonze et al. discloses a process for producing a lozenge which includes a sweetener of, for example, erythritol or maltitol, and a binding agent.

The final Sugar MNS that has been noted for general use as a sugar substitute is lactitol.

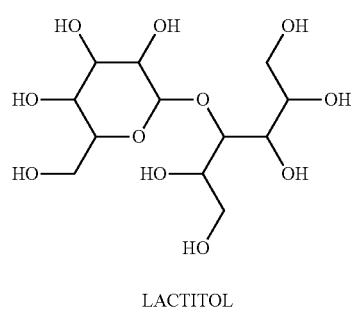 [SMILES: OCC(O)C(O)C(OC1OC(CO)C(O)C(O)C1O)C(O)CO]

LACTITOL

U.S. Pat. Nos. 5,516,763 and 5,672,589 to Heikkila et al. disclose crystalline lactitol monohydrate as a bulk sweetener for the total or partial replacement of sucrose, in dietetic products, confectionery, bakery products, cereals, desserts, jams, beverages, chocolate, chewing gum and ice-cream. In Heikkila et al., lactitol is disclosed as a fat replacement system in frozen products.

U.S. Pat. No. 5,527,554 to Olinger et al. discloses an improved frozen dessert made without sucrose or corn syrup solids. The frozen dessert is sweetened by lactitol and hydrogenated starch hydrolysates.

The present invention overcomes the deficiencies associated with the production of reduced calorie and diet FCBs through the use of freezing point depressants including sugars in combination with non-caloric sweeteners, Sugar MNSs, salts, acids and mixtures thereof, particularly erythritol, to produce reduced calorie frozen carbonated beverages. While Sugar MNSs have been used as reduced calorie alternative sweeteners in a variety of food products, including frozen dessert products, Sugar MNSs have never been considered for their freezing point depression in the production of frozen beverages.

SUMMARY OF THE INVENTION

It has been discovered that freezing point depressants, including sugars in combination with non-caloric sweeteners, Sugar MNSs, salts, acids and mixtures thereof enable the preparation of reduced calorie and non-caloric FCBs without adversely affecting product taste and quality. The present invention is a reduced calorie or non-caloric frozen carbonated beverage that remains slushy and dispensable. According to one aspect of the present invention there is disclosed a method for depressing the freezing point of diet beverage syrup by adding a freezing point depressant for use in the production of frozen carbonated beverages.

There is further disclosed, a reduced calorie or non-caloric frozen carbonated beverage including a Sugar MNS containing beverage syrup, carbon dioxide and water.

There is still further disclosed, a reduced calorie or non-caloric frozen non-carbonated beverage produced from a beverage syrup including a freezing point depressant.

Finally, there is disclosed a method of making a reduced calorie or non-caloric frozen carbon ated beverage by adding a freezing point depressant containing beverage syrup to a chamber with water and carbon dioxide to produce a reduced calorie frozen carbonated beverage.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE INVENTION

The present invention relates to the product of reduced calorie and non-caloric frozen beverage products and a method of producing them. The beverages according to the present invention may be carbonated or non-carbonated. Preferred beverages according to the present invention are carbonated.

In the known process for producing FCBs which is described, for example in U.S. Pat. No. 5,806,550 which is incorporated herein by reference in its entirety, water, beverage syrup and carbon dioxide are fed to a chamber within which the FCB will be produced. The terms "frozen carbonated dispenser" and "dispenser" are synonymous with an apparatus capable of dispensing a slushy product. Any currently known or after developed method for making FCB can be used with the present invention which relates to the use of freezing point depressants in the beverage syrup which reduces the calories of the beverage while depressing the freezing point of the syrup. As used in the present invention "reduced calorie" refers to a beverage that has 50% or less of the calories that would be associated with a full calorie equivalent beverage. A "substantially reduced calorie" beverage is one that has a 75% reduction in calories. A "non-caloric" FCB is one having a 100% or near 100% reduction in calories. The present invention results in a reduced calorie or non-caloric frozen carbonated beverage which remains slushy and dispensable.

The present invention involves utilizing various freezing point depressants including sugars, sugar alcohols, Sugar MNSs, salts and acids, along with high-potency non-caloric sweeteners to allow freezing point depression of reduced calorie or non-caloric frozen beverages and achieving a slush-like consistency.

Beverage syrups for use according to the present invention use a freezing point depressant alone or in combination with a high-potency non-caloric sweetener, such as aspartame or saccharin. Other high potency non-caloric sweeteners that may be used include acesulfame-K, cyclamate, sucralose, or a combination thereof. The term "non-caloric sweetener" refers to sweeteners which provide human bioavailable calorie contents of zero or nearly zero to food or beverage products.

Freezing point depressants for use according to the present invention include sugars when used in combination with non-caloric sweeteners. Preferred sugars for use according to the present invention include sucrose, high fructose corn syrup, glucose, fructose and lactose. When full calorie sugars are used as freezing point depressants, the resulting reduced calorie frozen carbonated beverage will achieve at least a 50% calorie reduction but due to the full calorie nature of the sugar will only be able to achieve a relative calorie reduction.

If a FCB is desired having more significantly reduced calories, then alternative freezing point depressants will have to be used. Other freezing point depressants for use according to the present invention include, propylene glycol, glycerol, and sorbitol. According to one embodiment of the present invention, glycerol is used as the freezing point depressant. While glycerol is a full calorie sweetener, it achieves sufficient freezing point depression at sufficiently low levels to result in a beverage having substantial calorie reductions.

Other reduced calorie FCBs can be prepared using Sugar MNSs. Sugar MNSs for use according to the present invention include any art recognized FDA approved compositions that provide the necessary freezing point depression when used in a reduced calorie beverage syrup.

As used in the present application, the term "Sugar MNS" refers to a polyhydric alcohol containing at least 3, preferably from 3 to 17 hydroxyl groups. Sugar MNSs include sugars (i.e., monosaccharides, disaccharides, and trisaccharides), sugar alcohols, other sugar derivatives (i.e., alkyl glycosides), polyglycerols such as diglycerol and triglycerol, pentaerythritol, sugar ethers such as sorbitan and polyvinyl alcohols. Non-limiting examples of sugars, sugar alcohols and sugar derivatives include xylose, arabinose, ribose, xylitol, glycerol, erythritol, glucose, methyl glucoside, mannose, galactose, fructose, sorbitol, maltose, lactose, sucrose, raffinose, tagatose, and maltotriose. Preferred Sugar MNSs for use in the present invention include erythritol, isomalt, maltitol, lactitol and fructo-oligosaccharide sweetener. Sugar MNSs can be used to prepare reduced calorie, substantially reduced calorie and non-caloric FCBs.

Sugar MNSs can be used in amounts that have been approved for use in food products. Preferably, erythritol is added in an amount of up to the current FDA approved limit of 3.5% (w/v).

Preferred Sugar MNSs for use in the present invention do not have a laxative effect when used in diet beverage syrup. The most preferred Sugar MNS for use in the present invention is erythritol since it exhibits essentially no laxative effect. Erythritol when consumed at moderate levels, e.g., in a FCB, is completely absorbed into the bloodstream from the small intestine and then is quantitatively excreted in the urine unchanged. Other Sugar MNSs such as isomalt, maltitol and lactitol are less preferred since they are not absorbed from the small intestine and they enter the large intestine where they are fermented by anaerobic bacteria to produce short chain fatty acids and gases. Short chain fatty acids have high water binding activity providing possible effects such as soft stools and diarrhea.

The diet beverage syrup according to the present invention including a freezing point depressant, e.g., a Sugar MNS, has sufficient freezing point depression to provide a dispensable reduced calorie FCB. The product is dispensed in a "slushy" condition. As used herein, the terms "slushy", "slush", "slushy-like", and "slush-like" are synonymous. These terms refer to the physical properties of beverages where the beverages are not in a solid frozen state and the viscosity of the beverages is higher than its liquid state at room temperature.

The FCBs according to the present invention can be modified with appropriate salts or acids to a level which does not interfere with the taste and quality of the resultant beverage. Appropriate salts include, but are not limited to, sodium chloride, potassium chloride, sodium gluconate or potassium gluconate. Other appropriate salts will be readily apparent to the skilled artisan. Preferred salts are those such as sodium gluconate or potassium gluconate which have less taste and therefore result in freezing point depression with less effect on the taste of the FCB.

FCBs according to the present invention can include any additives that would be acceptable in such beverages. Such additives may include for example preservatives. Appropriate additives and amounts would be readily apparent to the skilled artisan.

The formulation of the present invention provides beverages wherein the caloric content is reduced by 50% based on a full calorie equivalent FCB. Substantially reduced calorie beverages can be produced having a calorie content reduced by 75% and non-caloric beverages can be produced preferably having below 2 calories per 8 ounce serving.

EXAMPLES

The following examples illustrate the characteristics and properties of the invention. However, these examples do not limit the invention. The invention is limited only by the claims appended to this specification.

Example 1

Sample Calculation of Amount of Freezing Point Depressant

Freezing Point Depression for water is $$\Delta T = K_F m$$

where $\Delta T$ is the change in freezing point temperature in degrees Celsius, $K_F$ is the molal freezing point depression constant and is 1.855 for water and m is the molal concentration of solute in water. Now, if one takes a sucrose-sweetened beverage formulation and, for the purpose of simplicity assumes that all ingredients are held constant in concentration except for the sweetener concentration, then the molal concentration of the new reduced calorie sweetener system (e.g., erythritol and aspartame) must equal the molal concentration of sucrose in the original formulation. Since the molecular weight of sucrose is 342 and if the sucrose concentration in the original beverage was 10% (w/v), then the original beverage contained approximately 0.3 m of sucrose. To achieve the same freezing point depression, the erythritol and aspartame must have a total concentration of 0.3 m. Since aspartame will be present at only about 0.001 m, erythritol must be present at about 0.299 m. Since aspartame plays such a negligible role in freezing point depression, it is a reasonable approximation that all of the freezing point depression comes from erythritol. Thus, to get the same freezing point depression as 10% sucrose, i.e., 0.3 m sucrose, one must use 0.3 m erythritol. The molecular weight of erythritol is 122, thus requiring 36.6 grams of erythritol per 1000 g of water, approximately 3.5% (w/v). The resulting FCB would be non-caloric.

Alternatively, a reduced calorie FCB can be produced by replacing the 10% sucrose with 5% sucrose and 1.75% erythritol to achieve a product with a 50% reduction in calories.

Example 2

A reduced calorie beverage syrup according to the present invention was produced by combining 3.5% w/v of erythritol into cola flavored syrup and then reducing the level of the high-potency non-caloric sweetener, e.g., aspartame or saccharin by ⅓. This formulation resulted in syrup that's freezing point was depressed thereby achieving the production of a slushy-like product inside the frozen carbonated drink dispenser.

Example 3

A diet cola frozen carbonated beverage was prepared from a cola syrup containing freezing point depressant according to the present invention. 0.43% cola flavoring was combined with 0.02% of a preservative and 3.45 to about 3.55% of a sweetener system. The sweetener system contained between 3.41 and 3.49% erythritol, 0.02 to 0.05% aspartame and 0.005 to 0.008 saccharin.

Example 4

A diet cherry frozen carbonated beverage was prepared from a cherry syrup containing freezing point depressant according to the present invention. 0.19% cherry flavoring was combined with 0.02% of a preservative and 3.45 to about 3.55% of a sweetener system. The sweetener system contained between 3.41 and 3.49% erythritol, 0.02 to 0.05% aspartame and 0.005 to 0.008 saccharin.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A frozen carbonated or non-carbonated beverage dispenser system including a non-caloric beverage for dispensing from a mechanical mixing chamber comprising:
    a. a non-caloric beverage syrup containing a mixture of a high-potency non-caloric sweetener and a low caloric sugar, the low caloric sugar acting as a freezing point depressant and comprising erythritol in an amount of at least about 3.5% (w/v);
    b. water; and
    c. optionally, carbon dioxide;
    wherein the given freezing point is determined from a reference molal concentration of full-caloric sugar in a standard frozen carbonated beverage for achieving said given freezing point, and the amount of low-caloric sugar in the mixture is chosen to achieve substantially the same molal concentration thereof as the reference molal concentration to achieve said given freezing point; and
    wherein the beverage is dispensable from a mechanical mixing chamber as a slush.

2. The system according to claim 1, wherein the beverage syrup contains a high-potency non-caloric sweetener chosen from at least one of aspartame, saccharin, acesulfame-K, cyclamate, or sucralose.

3. The system according to claim 1, wherein said beverage syrup further comprises tagatose.

4. The system according to claim 1, wherein said beverage syrup further comprises at least one mineral salt.

5. A system according to claim 1, further comprising:
    a mechanical beverage dispenser including a mixing chamber for dispensing therefrom said reduced calorie beverage having a given freezing point.

6. The system according to claim 5, wherein the low caloric sugar further comprises a Sugar MNS chosen from at least one of isomalt, maltitol, lactitol, or fructo-oligosaccharide sweetener.

7. The system according to claim 1, wherein said beverage is carbonated.

8. A method of making a non-caloric frozen carbonated dispenser beverage having a given freezing point comprising dispensing from a mechanical beverage dispenser having a mechanical mixing chamber a combination comprising:
    a. a non-caloric beverage syrup containing a mixture of a high-potency non-caloric sweetener and a low caloric sugar, said low caloric sugar acting as a freezing point depressant and comprising erythritol in an amount of at least about 3.5% (w/v);
    b. water; and
    c. carbon dioxide,
    wherein the amount of low caloric sugar is chosen to achieve said given freezing point, and
    wherein the given freezing point is determined from a reference molal concentration of full-caloric sugar in a standard frozen carbonated beverage for achieving said given freezing point, and the amount of low caloric sugar in the mixture is selected to achieve substantially the same molal concentration thereof as the reference molal concentration.

9. The method according to claim 8, wherein the low caloric sugar further comprises a Sugar MNS chosen from at least one of isomalt, maltitol, lactitol, or fructo-oligosaccharide sweetener.

10. The method according to claim 8, wherein the beverage syrup contains a high-potency non-caloric sweetener chosen from at least one of aspartame, saccharin, acesulfame-K, cyclamate, or sucralose.

11. The method according to claim 8, wherein said beverage syrup further comprises tagatose.

12. The method according to claim 8, wherein said beverage syrup further comprises at least one mineral salt.

13. A method of controlling the freezing point depressant characteristics of a non-caloric beverage syrup for a frozen dispenser beverage dispensable from a mechanical mixing chamber to be mixed with a diluent comprising the steps of:
    a. blending a high-potency non-caloric sweetener and a low-caloric sugar, said low-caloric sugar acting as a freezing point depressant for the finished beverage formulation and comprising erythritol in an amount of at least about 3.5% (w/v);
b. controlling the amount of low-caloric sugar to achieve a given freezing point of the finished beverage formulation; and
wherein the given freezing point is determined from a reference molal concentration of full-caloric sugar in a standard frozen carbonated beverage for achieving said given freezing point, and the amount of low caloric sugar in the mixture is selected to achieve substantially the same molal concentration thereof as the reference molal concentration,
wherein the low caloric sugar depressed the freezing point of the finished beverage formulation rendering it dispensable from said mechanical mixing chamber.

14. The method of claim 13, wherein the low caloric sugar further comprises a Sugar MNS chosen from at least one of isomalt, maltitol, lactitol, or fructo-oligosaccharide sweetener.

15. The method of claim 13, wherein the beverage syrup contains a high-potency non-caloric sweetener chosen from at least one of aspartame, saccharin, acesulfame-K, cyclamate, or sucralose.

16. The method according to claim 13, wherein said beverage syrup further comprises tagatose.

17. The method according to claim 13, wherein said beverage syrup further comprises at least one mineral salt.

18. A non-caloric frozen carbonated dispenser beverage having a given freezing point for dispensing from a mechanical mixing chamber comprising:

a. a non-caloric beverage syrup containing a mixture of high-potency non-caloric sweetener and a low caloric sugar, the low caloric sugar depressing the freezing point of the mixture to create a frozen carbonated beverage dispensable from said mechanical mixing chamber, said low caloric sugar comprising erythritol in an amount of at least about 3.5% (w/v);
b. water; and
c. carbon dioxide;
wherein the given freezing point is determined from a reference molal concentration of full-caloric sugar in a standard frozen carbonated beverage for achieving said given freezing point, and the amount of low-caloric sugar in the mixture is selected to achieve substantially the same molal concentration thereof as the reference molal concentration.

19. The beverage according to claim 18, wherein the low caloric sugar further comprises a Sugar MNS chosen from at least one of isomalt, maltitol, lactitol, and fructo-oligosaccharide sweetener.

20. The beverage according to claim 18, wherein the beverage syrup contains a high-potency non-caloric sweetener selected from at least one of aspartame, saccharin, acesulfame-K, cyclamate, and sucralose.

21. The beverage according to claim 18, wherein said beverage syrup further comprises tagatose.

22. The beverage according to claim 18, wherein said beverage syrup further comprises at least one mineral salt.

* * * * *